United States Patent
Ghoneim et al.

[19]

[11] Patent Number: 6,112,147
[45] Date of Patent: Aug. 29, 2000

[54] VEHICLE YAW RATE CONTROL WITH BANK ANGLE COMPENSATION

[75] Inventors: Youssef Ahmed Ghoneim, Macomb Township, Macomb County; David Michael Sidlosky, Huntington Woods, both of Mich.

[73] Assignee: General Motors Corporation, Detroit, Mich.

[21] Appl. No.: 09/134,954

[22] Filed: Aug. 17, 1998

[51] Int. Cl.[7] .................................................. B60T 8/58
[52] U.S. Cl. ................. 701/80; 701/72; 303/146
[58] Field of Search ............................. 701/79, 80, 72, 701/83; 303/150, 155, 146, 189, 192

[56] References Cited

U.S. PATENT DOCUMENTS

| | | | |
|---|---|---|---|
| 4,834,205 | 5/1989 | Mizuno et al. | 180/141 |
| 4,998,593 | 3/1991 | Karnopp et al. | 180/408 |
| 5,063,514 | 11/1991 | Headley et al. | 364/426.02 |
| 5,172,961 | 12/1992 | Inoue et al. | 303/100 |
| 5,229,944 | 7/1993 | Yasuno | 364/426.01 |
| 5,275,474 | 1/1994 | Chin et al. | 303/148 |
| 5,275,475 | 1/1994 | Hartmann et al. | 303/103 |
| 5,311,431 | 5/1994 | Cao et al. | 364/424.05 |
| 5,341,297 | 8/1994 | Zomotor et al. | 364/426.03 |
| 5,366,281 | 11/1994 | Littlejohn | 303/188 |
| 5,402,342 | 3/1995 | Ehret et al. | 364/424.05 |
| 5,444,621 | 8/1995 | Matsunaga et al. | 364/424.05 |

(List continued on next page.)

FOREIGN PATENT DOCUMENTS

| | | |
|---|---|---|
| 0 555 860 A1 | 8/1993 | European Pat. Off. . |
| 41 23 235 C1 | 11/1992 | Germany . |
| 41 21 954 A1 | 1/1993 | Germany . |
| 42 00 061 A1 | 7/1993 | Germany . |
| 42 23 385 A1 | 1/1994 | Germany . |
| 42 29 504 A1 | 3/1994 | Germany . |
| 43 11 077 A1 | 10/1994 | Germany . |

(List continued on next page.)

OTHER PUBLICATIONS

May The Cornering Force Be With You; Popular Mechanics; Dec. 1995, pp. 74–77.
Stable As She Goes: Don Sherman, Automotive Industries, May 1995.
The Spin Doctors: Don Sherman, 12PS95, Not dated.
Mercedes/Bosch ESP; Automotive Industries, Apr. 1995.
Controlling Vehicle Stability; Christopher A. Sawyer, Automotive Industries, Jan. 1995.
Let Magic Fingers Do The Driving: Wards Auto World; May 1995.
Technoid: Intelligent Brakes Are On The Way; Car and Driver, Aug. 1994.
Toyota Vehicle Stability Control System; Automotive Engineering, Aug. 1995.
Vehicle Dynamics Offers New Level Of Safety: Machine Design, Sep. 1994.
Handling Control Systems For Your Car: Popular Electronics; Feb. 1995.

(List continued on next page.)

*Primary Examiner*—Michael J. Zanelli
*Attorney, Agent, or Firm*—Anthony Luke Simon

[57] ABSTRACT

An improved low cost vehicle yaw rate control that is compensated for road bank angle using readily available information, such as steering angle, vehicle speed, and the speeds of the un-driven vehicle wheels. The control is founded on the recognition that, under linear operating conditions on a banked surface, the difference between the desired yaw rate and the actual or estimated yaw rate yields a yaw rate offset that will compensate for the bank angle, and the product of yaw rate and vehicle speed corresponds substantially to lateral acceleration. The yaw rate offset is used to compensate the yaw control when the steering angle, the yaw rate—vehicle speed product and yaw rate error are indicative of operation on a banked road. The compensation is deactivated when the steering angle, the yaw rate—vehicle speed product and yaw rate error are not indicative of operation on a banked road.

7 Claims, 6 Drawing Sheets

U.S. PATENT DOCUMENTS

| | | | |
|---|---|---|---|
| 5,446,658 | 8/1995 | Pastor et al. | 701/1 |
| 5,480,219 | 1/1996 | Kost et al. | 303/146 |
| 5,642,281 | 6/1997 | Ishida et al. | 701/41 |
| 5,671,143 | 9/1997 | Graber | 701/72 |
| 5,711,585 | 1/1998 | Tozu et al. | 303/146 |
| 5,720,533 | 2/1998 | Pastor et al. | 303/147 |
| 5,746,486 | 5/1998 | Paul et al. | 303/146 |
| 5,832,402 | 11/1998 | Brachert et al. | 701/72 |
| 5,915,800 | 6/1999 | Hiwatashi et al. | 303/146 |

FOREIGN PATENT DOCUMENTS

| | | |
|---|---|---|
| 43 14 827 A1 | 11/1994 | Germany . |
| 40 52 62213 | 10/1993 | Japan . |
| 40 60 24304 | 2/1994 | Japan . |
| 40 60 87421 | 3/1994 | Japan . |
| 40 61 15418 | 4/1994 | Japan . |
| 40 61 27354 | 5/1994 | Japan . |
| 2 275 551 | 1/1993 | United Kingdom . |
| 2 263 340 | 7/1993 | United Kingdom . |
| 2 269 571 | 2/1994 | United Kingdom . |
| 2 275 312 | 8/1994 | United Kingdom . |

OTHER PUBLICATIONS

VDC, The Vehicle Dynamics Control System Of Bosch: A. VanZanten, R. Erhardt and G. Pfaff; Robert Bosch GmbH; No. 950759, pp. 9–26, Not dated.

Active Stability Control; Junichi Kubokawa, Aisin Seiki Co., Ltd., Electronics & Brake Division; Abstract; Sep. 1995.

Consideration of Lateral and Longitudinal Vehicle Stability by Function Enhanced Brake and Stability Control System; Heinz Leffler; SAE #940832; Feb. 28—Mar. 3, 1994.

Control Of Vehicle Dynamics: Automotive Engineering; pp. 87–93; May 1995.

Improvement Of Vehicle Maneuverability By Direct Yaw Moment Control; Y. Shibahata, K. Shimada and T. Tomari; Society of Automotive Engineers of Japan, Inc.; pp. 464–481; 1993.

Spin Control For Cars; Steven Ashley; Mechanical Engineering; pp. 66–68; Jun. 1995.

VEHICLE YAW RATE CONTROL WITH BANK ANGLE COMPENSATION

This invention relates to a low cost vehicle yaw rate control that does not require a lateral acceleration sensor, and more particularly to a method for compensating the control for the bank angle of the road surface.

BACKGROUND OF THE INVENTION

Chassis control technology has achieved noteworthy progress, thanks to advancements in sensing and computing technologies as well as advances in estimation and control theory. This has permitted the design of various control systems using active means. One such enhancement is the control and adjustment of the tire forces through the braking force distribution control strategy, using a steering wheel angle sensor, a lateral accelerometer, and a yaw rate sensor to devise a yaw rate feedback control. Because the price of these different sensors is still high, this technology is limited to a small number of vehicles.

While a low cost implementation of this technology can be obtained by estimating the yaw rate and eliminating the yaw rate and/or lateral acceleration sensors, various operating conditions that are customarily inferred from the sensor information must be determined in some other way. One such operating condition is the bank angle of the road surface on which the vehicle is being driven. When operating on a banked road, the driver introduces a steering correction to maintain a desired course in spite of the bank, and the control should be compensated in these situations to avoid an unnecessary yaw rate command. For example, in a control described in U.S. Pat. No. 5,720,533 to Ghoneim et. al., and assigned to the assignee of the present invention, a bank angle compensation term is computed as a function of the sensed lateral acceleration. Accordingly, what is needed is a yaw control that compensates for bank angle without requiring a lateral acceleration sensor.

SUMMARY OF THE INVENTION

It is an object of this invention to provide a vehicle suspension control system according to claim 1.

The present invention is directed to an improved, low cost, vehicle yaw control that is compensated for road bank angle using readily available information, such as steering angle, vehicle speed, and the speeds of the un-driven vehicle wheels. The control is founded on the recognition that, under linear operating conditions on a banked surface, the difference between the desired yaw rate and the actual or estimated yaw rate yields a yaw rate offset that will compensate for the bank angle, and the product of yaw rate and vehicle speed corresponds substantially to lateral acceleration. The yaw rate offset is used to compensate the yaw control when the steering angle, the yaw rate—vehicle speed product and yaw rate error are indicative of operation on a banked road. The compensation is deactivated when the steering angle, the yaw rate—vehicle speed product and yaw rate error are not indicative of operation on a banked road.

BRIEF DESCRIPTION OF THE DRAWINGS

The present invention will now be described by way of example with reference to the following figures, in which:

FIG. 4 is directed to determining an initial bank compensation term; FIG. 5 is directed to the bank-in logic; FIG. 6 is directed to the bank-out logic; and FIG. 7 is directed to determining the applied bank compensation term; —FIG. 8 represents vehicle operation on a banked road surface, and FIG. 9 represents vehicle operation on a road surface that changes from a negative bank angle to a positive bank angle.

DETAILED DESCRIPTION OF THE INVENTION

Figure 1:
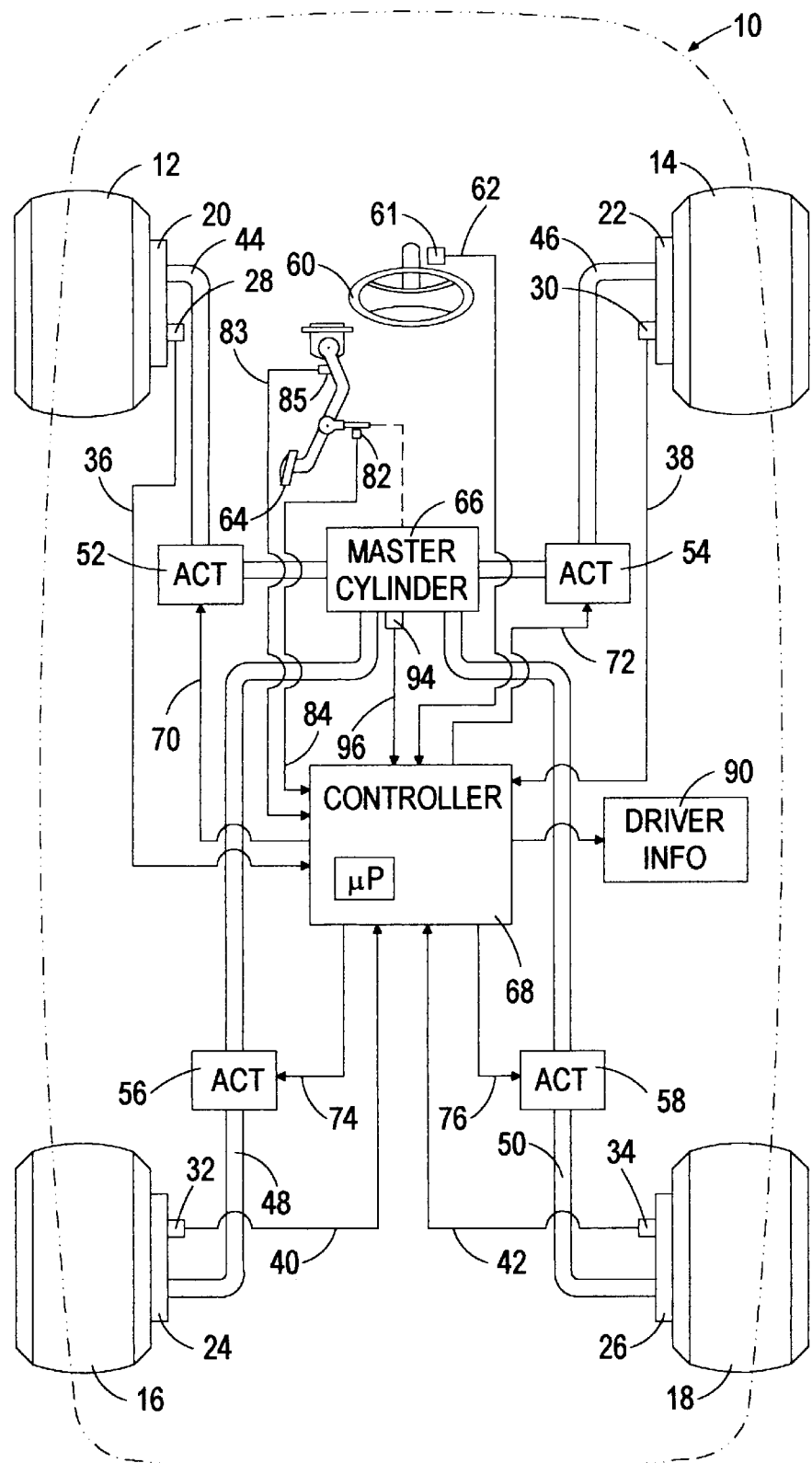
FIG. 1 is a diagram of a vehicle including an electronic controller and associated input and output devices constituting a control system for carrying out an active brake control of vehicle yaw.

FIG. 1 depicts a mechanization of an active brake control according to this invention on a vehicle 10. The vehicle 10 includes a brake system having a micro-processor based controller 68 for controlling the brakes 20, 22, 24, 26 of the respective wheels 12, 14, 16, 18. The controller 68 receives various inputs, including wheel speed signals on lines 36, 38, 40, 42 from respective wheel speed sensors 28, 30, 32, 34; a brake pedal travel signal on line 83 from pedal travel sensor 82; a steering wheel angle signal on line 62 from angle sensor 61; and a master cylinder pressure signal on line 96 from the pressure sensor 94. The sensors 28, 30, 32, 34, 61, 82, 94 may be implemented with conventional devices in a manner known to those skilled in the art.

Under certain conditions such as wheel lock-up or spinning, or lateral instability, the controller 68 modifies the normal braking of one or more wheel 12, 14, 16, 18 via the respective actuators 52, 54, 56, 58 in order to restore a desired overall operation of the vehicle. In an incipient lock-up condition, the controller 68 commands one or more of the respective actuator(s) 52, 54, 56, 58 to modulate the brake force developed at the wheel(s) experiencing the condition. In a wheel slip condition, the controller 68 commands one or more of the respective actuator(s) 52, 54, 56, 58 to develop brake force at the slipping wheel(s). In a case of lateral instability, the controller 68 commands one or more of the respective actuator(s) 52, 54 to selectively increase or decrease the brake forces generated at the driven wheels 12, 14 to produce a commanded yaw. Theoretically, the yaw control may be additionally be applied to the rear (driven) wheels 16, 18, but this tends to corrupt yaw estimation based on wheel speeds. Exemplary actuators are shown and described in detail in the U.S. Pat. No. 5,366,291, assigned to the assignee of the present invention.

Figure 2:
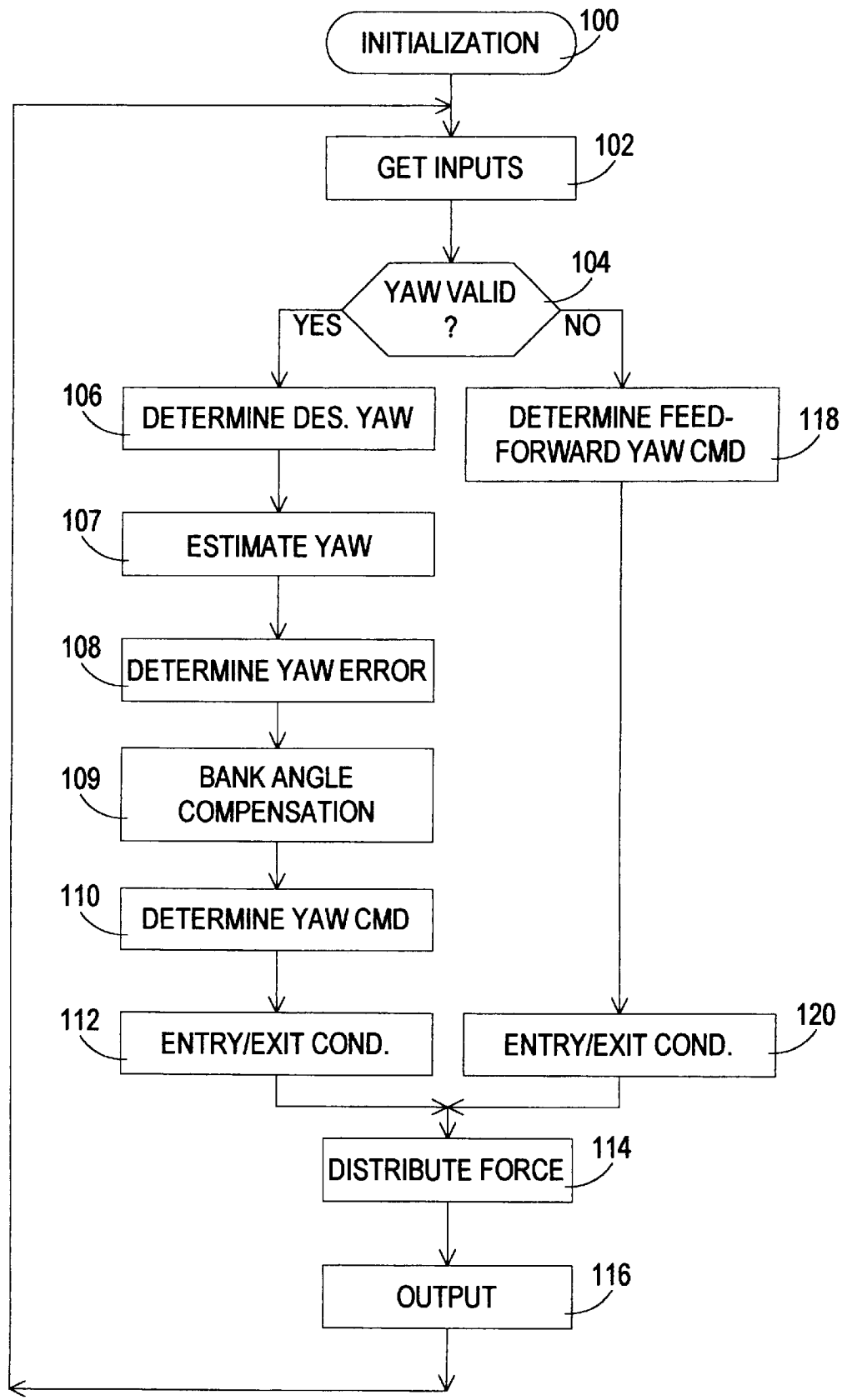
FIG. 2 is a main flow diagram representative of computer instructions executed by the electronic controller of FIG. 1 in carrying out the control of this invention.

FIG. 2 is a main flow diagram for carrying out a control according to this invention in the context of a low-cost yaw control that requires neither a yaw rate sensor nor a lateral acceleration sensor. While the control of this invention could just as easily be implemented in a system having a yaw rate sensor, the illustrated embodiment is particularly cost-effective.

Referring to FIG. 2, the block 100 designates a series of initialization instructions executed at the initiation of vehicle operation for appropriately setting the initial condition or state of the various terms and flags referred to below. After reading the various sensor inputs at block 102, the block 104 is executed to determine the status of the YAW VALID FLAG. The status of the YAW VALID FLAG indicates whether the estimated yaw value is considered to be valid, as may be periodically determined by an interrupt service routine such as the one described in co-pending U.S. patent application Ser. No. 09/080,372, filed on May 18, 1998, assigned to the assignee of the present invention, and incorporated herein by reference. Of course, the yaw validity determination would be eliminated entirely in a system having a yaw rate sensor.

If the estimated yaw rate is considered to be valid (i.e., YAW VALID FLAG=1), the blocks 106–112 are executed to determine a closed-loop yaw command. Block 106 determines a desired yaw value $\Omega_{des}$ for the vehicle based on various inputs including the vehicle speed $V_x$ and the measured steering wheel angle $\delta$. For example, $\Omega_{des}$ may be determined according to the expression:

$$\Omega_{des} = V_x \, \delta/(L + K_u V_x^2) \tag{1}$$

where L is wheel base of the vehicle, and $K_u$ is an understeer coefficient. Block 107 determines an estimated yaw rate $\Omega_{est}$ as a function of the left and right un-driven wheel speeds $\omega_1$ and $\omega_r$ and the track t of the vehicle, as follows:

$$\omega_{est} = (\omega_1 - \omega_r)/t \tag{2}$$

In the usual application, the vehicle has a front-wheel drive powertrain, and the un-driven wheels are the left and right rear wheels 16 and 18. Block 108 determines the yaw error $\Omega_{err}$ based on the deviation of the yaw estimate from the desired yaw rate. Block 109 concerns the determination and application of bank angle compensation according to this invention, and is described below in reference to the flow diagrams of FIGS. 3–7. Block 110 determines a yaw rate command based on the compensated yaw rate error and suitable gain factors, and block 112 decides if active brake control is warranted based on predefined entry and exit conditions.

If the estimated yaw rate is considered to be invalid (YAW VALID FLAG=0), the block 118 is executed to determine an open-loop or feed-forward yaw command based on the desired yaw rate of equation (1), using conventional proportional and derivative control gains. Block 120 decides if active brake control is warranted based on predefined entry and exit conditions, which may differ from the entry and exit conditions designated at block 112.

Finally, block 114 carries out an algorithm for distributing braking forces between the left and right vehicle wheels, and block 116 applies corresponding brake control signals to the brake actuators 152–158. Preferably, braking is only applied to the driven wheels of the vehicle so as to not corrupt the yaw estimate. Various brake distribution strategies may be utilized, exemplary strategies being disclosed in the U.S. patent applications Ser. No. 08/654,982 and Ser. No. 08/732,582, both of which are assigned to the assignee of the present invention.

Figure 3:
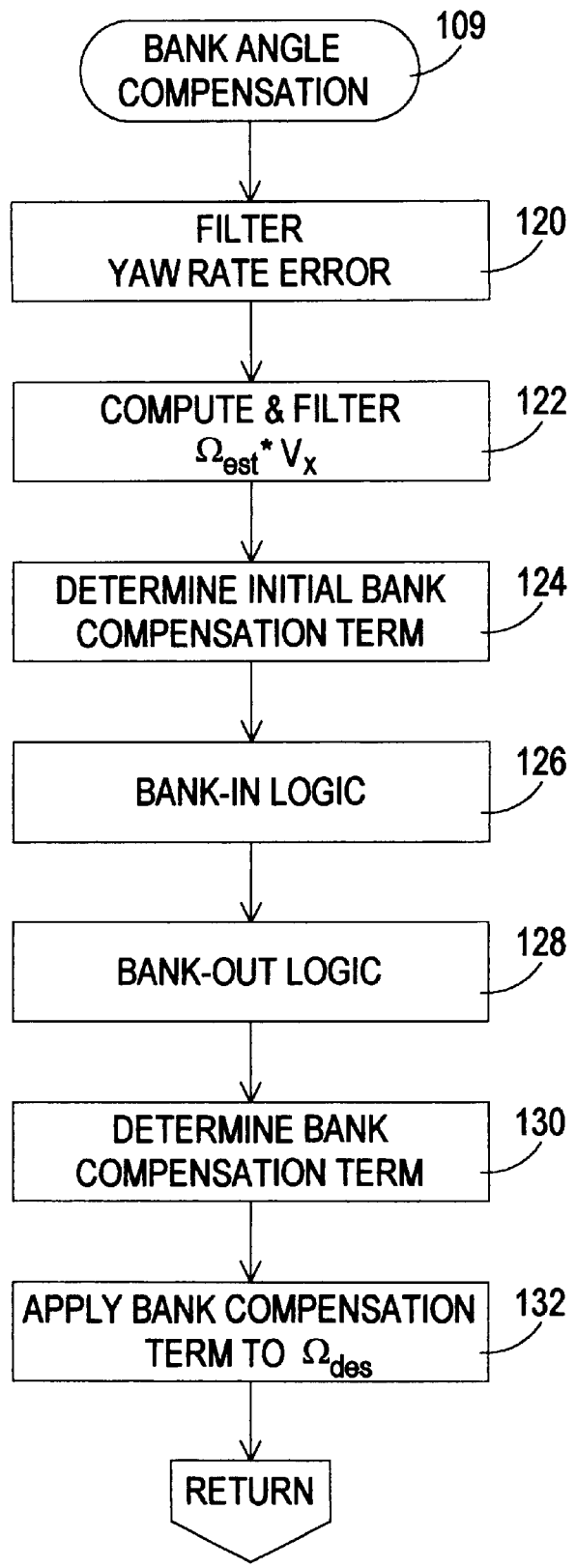
FIGS. 3 is a flow diagrams setting forth further detail regarding the bank angle compensation step of FIG. 2.

The flow diagram of FIG. 3 sets forth the principle steps of the bank angle compensation block 109 of FIG. 2. The blocks 120–132 are executed in sequence to determine an initial bank compensation term BCinit, to determine if bank compensation term should be activated, and to set the bank compensation term accordingly. In general, this invention recognizes that under linear operating conditions of the vehicle, the measured or estimated yaw rate is approximately equal to the desired yaw rate, and that when traveling on a banked road surface, the difference between measured and desired yaw rate (that is, the yaw rate error) represents a yaw offset that will compensate for the effect of the bank. It is necessary, however, to distinguish between yaw rate error caused by driving on a banked road surface and yaw rate error for which a corrective yaw command should be produced. Accordingly, an important aspect of this invention lies in activating the bank angle compensation only when it is determined that the vehicle is operating on a banked surface. According to the invention, this involves monitoring three factors: steering wheel angle, yaw rate error, and the product ($\Omega_{est}V_x$) of yaw rate and vehicle speed. Under linear operating conditions, the product $\Omega_{est}V_x$ is closely related to the lateral acceleration of the vehicle, since the side slip velocity rate $d(V_y)/dt$ is related to the lateral acceleration $a_y$ and the product $\Omega_{est}V_x$ as follows:

$$d(V_y)/dt = a_y - \Omega_{est}V_x \tag{3}$$

In linear operation on a banked surface, the side slip velocity rate $d(V_y)/dt$ can be considered substantially zero, demonstrating that the product $\Omega_{est}V_x$ is substantially equal to the lateral acceleration $a_y$. Finally, a pair of software counters or timers are used to measure the time-in-bank and time-out-of-bank to prevent activation of the bank compensation in response to transient operating conditions.

Referring to FIG. 3, the block 120 is first executed to filter the yaw rate error $\Omega_{err}$ to form a filtered yaw rate error term, designated as $\Omega_{err-f}$. In the illustrated embodiment, the term $\Omega_{err-f}$ is given by:

$$\Omega_{err-f}(k) = \Omega_{err-f}(k-1) + FC^*[\Omega_{err-f}(k) - \Omega_{err-f}(k-1)] \tag{4}$$

where FC is a filter constant having a value of 0.02, for example, and the designations (k) and (k−1) refer to the current and previous control loop values, respectively, of the term $\Omega_{err-f}$. The block 122 is then executed to compute and filter the product $\Omega_{est}V_x$. Similar to equation (4), the filtered version $\Omega_{est}V_{x-f}$ of the product $\Omega_{est}V_x$ is given by:

$$\Omega_{est}V_{x-f}(k) = \Omega_{est}V_{x-f}(k-1) + FC^*[\Omega_{est}V_{x-f}(k) - \Omega_{est}V_{x-f}(k-1)] \tag{5}$$

Figure 4:
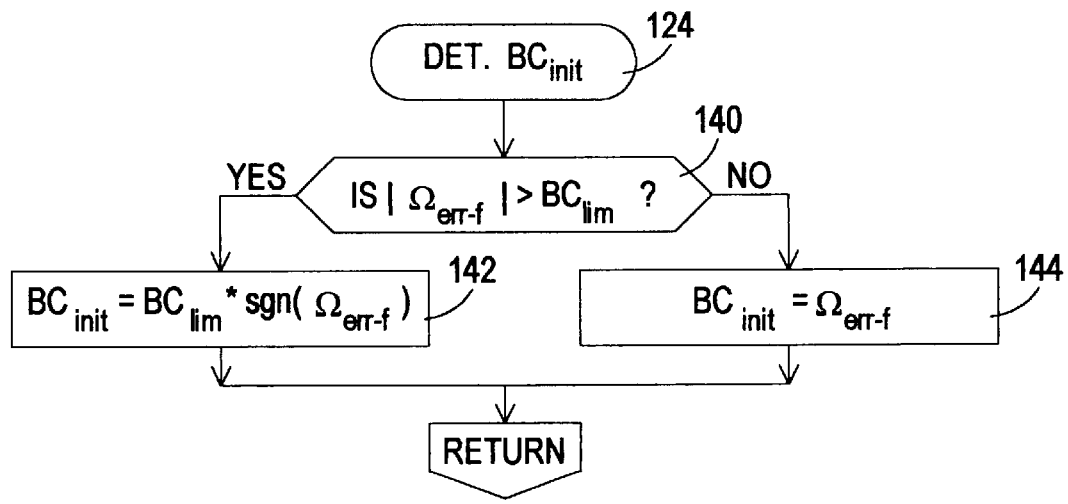
FIGS. 4–7 are flow diagrams setting forth further detail regarding various flow diagram steps of FIG. 3.

Block 124 then determines the initial bank offset or compensation term, $BC_{init}$, as a function of the filtered yaw error $\Omega_{err-f}$, as shown in further detail in the flow diagram of FIG. 4. Referring to FIG. 4, the block 140 is first executed to compare the absolute value of $\Omega_{err-f}$ with a yaw compensation limit $BC_{lim}$, such as 4 degrees/sec. This corresponds to a bank angle of approximately 20 degrees. If $\Omega_{err-f}$ exceeds the limit, block 142 sets $BC_{init}$ equal to the limit $BC_{lim}$, preserving the sign of $\Omega_{err-f}$. Otherwise, block 144 sets $BC_{init}$ equal to $\Omega_{err-f}$.

Figure 5:
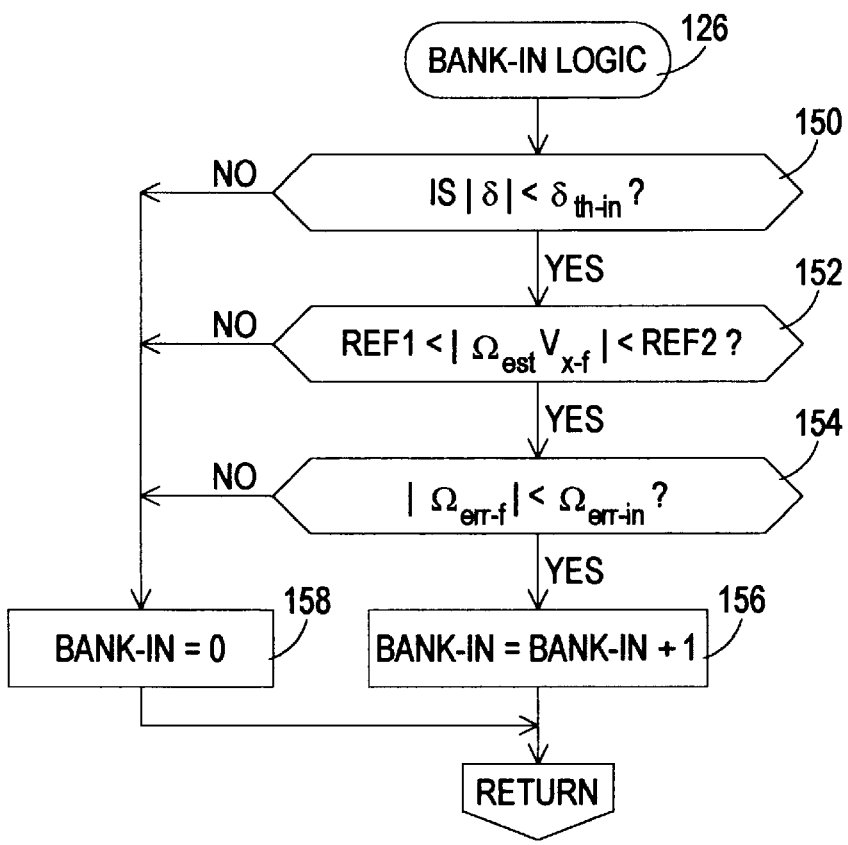
Figure 6:
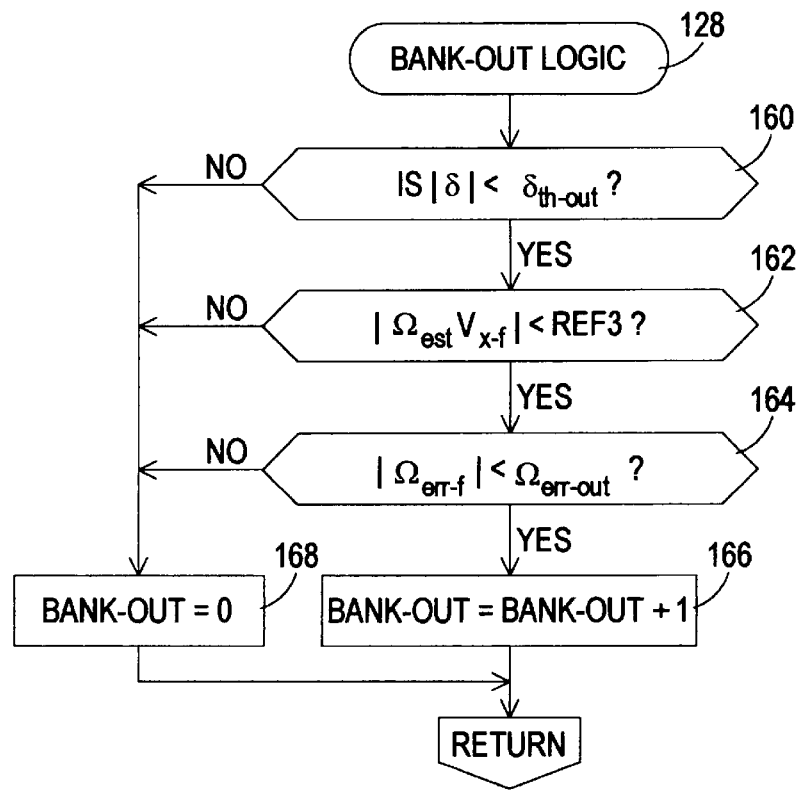
Figure 7:
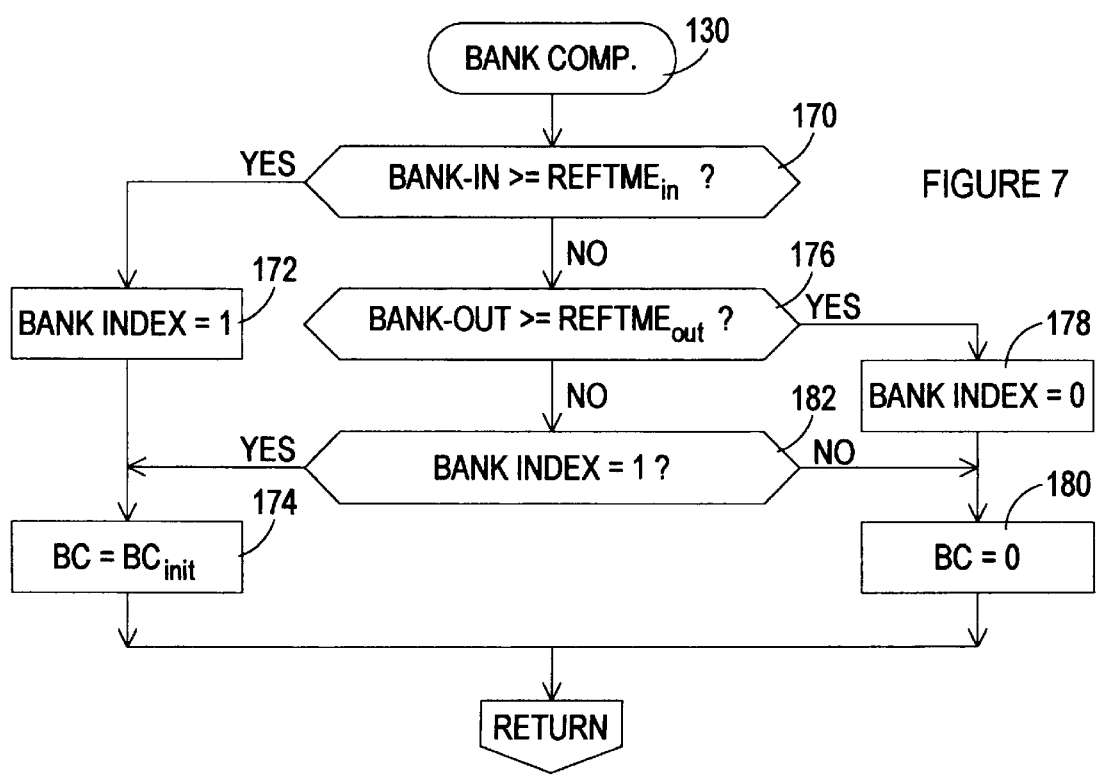

Returning to FIG. 3, the block 126 determines if the various operating parameters of the vehicle are indicative of a banked road surface, and increments or resets a counter (BANK-IN) accordingly. This functionality is shown in further detail in the flow diagram of FIG. 5. Referring to FIG. 5, the blocks 150–154 define three conditions that must be satisfied to conclude that the vehicle is operating on a banked surface. If the conditions are satisfied, block 156 increments the counter term, BANK-IN. If one or more of the conditions are not satisfied, the block 158 resets BANK-IN to zero. The first condition, determined at block 150, is that the magnitude of the steering angle $\delta$ is less than a bank-in threshold $\delta_{th-in}$, such as 30 degrees. The second condition, determined at block 152, is that the magnitude of the product $\Omega_{est}V_{x-f}$ is within a window defined by the lateral acceleration reference values REF1 and REF2, which may be 0.2 g and 1.0 g, respectively. Finally, the third condition, determined at block 154, is that the magnitude of the filtered yaw rate error $\Omega_{err-f}$ is less than a bank-in threshold $\Omega_{err-in}$ such as 10 degrees/sec.

Returning to FIG. 3, the block 128 determines if the various operating parameters of the vehicle are not indicative of a banked road surface, and increments or resets a counter (BANK-OUT) accordingly. This functionality is shown in further detail in the flow diagram of FIG. 6, where the blocks 160–164 define three conditions generally corresponding to the conditions defined by blocks 150–154 of FIG. 5. In this case, however, it is concluded that the vehicle is not operating on a banked surface if the conditions are satisfied. If the conditions are satisfied, block 166 increments the counter term, BANK-OUT, and if one or more of the conditions are not satisfied, the block 168 resets BANK-OUT to zero. The first condition, determined at block 160, is that the magnitude of the steering angle δ is less than a bank-out threshold $\delta_{th-out}$, such as 10 degrees. The second condition, determined at block 162, is that the magnitude of the product $\Omega_{est}V_{x-f}$ is less than the lateral acceleration reference values REF3, which may be 0.1 g. Finally, the third condition, determined at block 164, is that the magnitude of the filtered yaw rate error $\Omega_{err-f}$ is less than a bank-out threshold $\Omega_{err-out}$ such as 5 degrees/sec.

Returning to FIG. 3, the block 130 is then executed to determine whether bank compensation should be activated, based on the BANK-IN and BANK-OUT counters. This functionality is detailed in FIG. 7, where blocks 170 and 176 compare the BANK-IN and BANK-OUT counters to reference times $REFTME_{in}$ and $REFTME_{out}$, respectively. If the BANK-IN counter is at least as great as the reference time $REFTME_{in}$, which may be 0.5 seconds, the block 172 sets a BANK INDEX or flag equal to one, and block 174 sets the bank compensation term BC equal to $BC_{init}$. If block 170 is answered in the negative, and the BANK-OUT counter is at least as great as the reference time $REFTME_{out}$, which may be 0.3 seconds, the block 178 sets the BANK INDEX or flag equal to zero, and block 180 sets the bank compensation term BC equal to zero. If blocks 170 and 176 are both answered in the negative, the value of the BANK INDEX is used to maintain the current status of bank compensation, as indicated at block 182. Initially, the BANK INDEX is zeroed by block 100, so that bank compensation is not activated until the conditions defined by blocks 150–154 of FIG. 5 are satisfied.

Finally, returning to FIG. 3, the block 132 is executed to apply the bank compensation term BC to the yaw rate error $\Omega_{err}$ to form a compensated yaw rate error $\Omega_{err-comp}$. That is:

$$\Omega_{err-comp} = \Omega_{des} - \Omega_{est} - BC \quad (6)$$

It is the compensated value $\Omega_{err-comp}$ that is then used in block 110 of FIG. 2 to determine the yaw command. It should be recognized, of course, that the compensation term could just as well be applied to the desired or estimated yaw error, if so desired.

Figure 8:
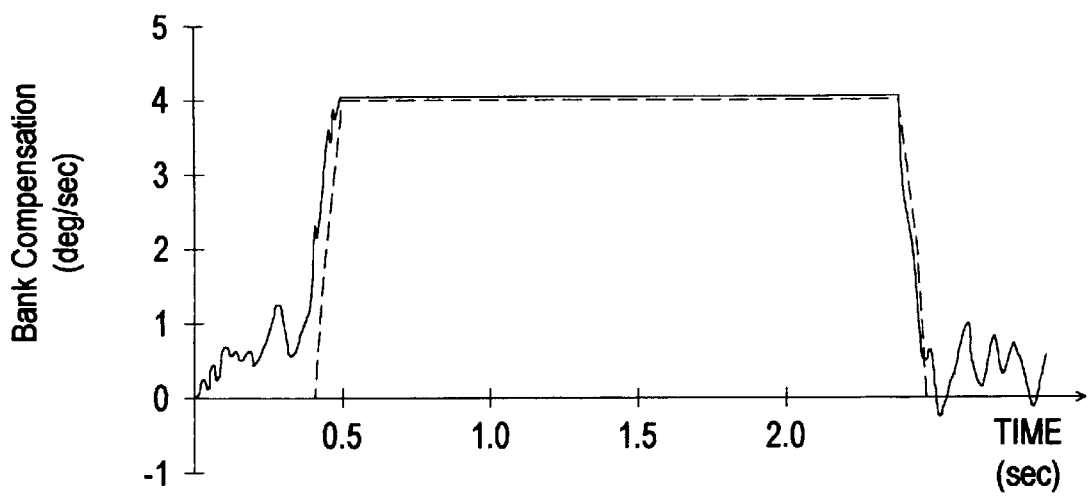
FIGS. 8–9 graphically depict the operation of the control of this invention
Figure 9:
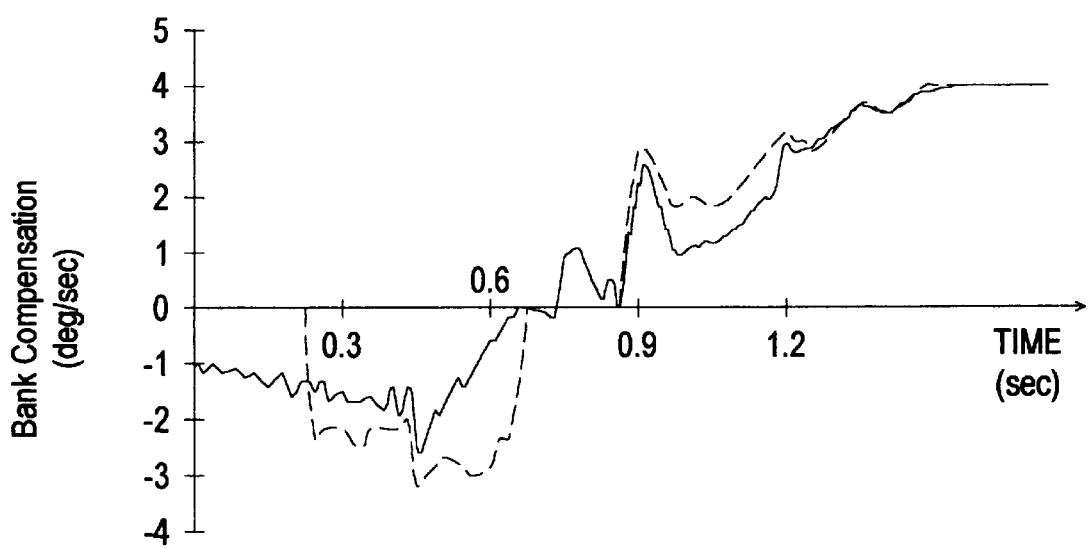

FIGS. 8 and 9 graphically compare the operation of the yaw control of this invention with a yaw control having bank angle compensation based on a lateral acceleration sensor as set forth in the above-referenced U.S. Pat. No. 5,720,533. In each graph, the solid trace designates the bank compensation term developed with the use of a lateral acceleration sensor, and the broken trace designates the bank compensation term BC according to this invention. The traces of FIG. 8 correspond to vehicle operation on a road surface bank angle of 28 degrees, at a speed of 60 miles/hr, over an interval of approximately 2.5 seconds. The traces of FIG. 9 correspond to vehicle operation on a road surface where the bank angle changes from negative to positive, at a speed of 70 miles/hr, over an interval of approximately 1.2 seconds. As demonstrated by the traces, the bank compensation of the present invention provides comparable performance, despite the absence of a lateral acceleration sensor.

In summary, this invention provides a low-cost vehicle yaw control that compensates the yaw control for yaw effects due to operation on a banked road surface, without knowing the bank angle, and without requiring a lateral acceleration sensor. As indicated above, it is expected that various modifications of the illustrated embodiment will occur to those skilled in the art, and in this regard, it will be understood that the scope of this invention is not necessarily limited by the illustrated embodiment, but instead is defined by the appended claims.

What is claimed is:

1. A yaw rate control method utilizing differential braking of the vehicle wheels to impart a desired yaw moment on the vehicle, the method comprising the steps of:

measuring the vehicle speed and steering angle;

determining a desired yaw rate for the vehicle;

determining an axial yaw rate of the vehicle;

determining a yaw are error based a deviation of said actual yaw rate from said desired yaw rate;

computing the desired yaw rate moment based on the determined yaw rate error;

monitoring a plurality of vehicle parameters, and comparing said parameters to predetermined threshold values to determine if the vehicle is operating on a banked surface;

forming a yaw rate offset based on the determined yaw rare error when it is determined that the vehicle is operating on a banked surface; and compensating time determined yaw rate error with said yaw rate offset to compensate the yaw rate control for yaw rate effects due to the banked surface, wherein said vehicle parameters include a lateral acceleration related parameter based on a product of the determined actual yaw rate and the measured vehicle speed.

2. The yaw rate control method of claim 1, wherein the vehicle has a pair of un-driven wheels, and the step of determining an actual yaw rate of the vehicle includes the steps of:

measuring the speeds of the un-driven wheels; and computing an estimate of the actual yaw rate based on a difference of the measured wheel speeds.

3. The yaw rate control method of claim 1, wherein the step of monitoring a plurality of vehicle parameters includes the steps of:

comparing the measured steering angle, the lateral acceleration related parameter and the determined yaw rate error to a first set of threshold values indicative of vehicle operation on a banked surface; and determining that the vehicle is operating on a banked surface if said vehicle parameters satisfy said first set of threshold values for at least a predetermined period of time.

4. The yaw rate control of claim 3, including the steps of: comparing the measured steering angle, the lateral acceleration related parameter and the determined yaw rate error to a second set of threshold values not indicative of vehicle operation on a banked surface; and determining that the vehicle is not operating on a banked surface if said vehicle parameters satisfy said second set of threshold values for at least a predetermined period of time.

5. The yaw rate control of claim 1, including the steps of:

computing the product of the determined actual yaw rate and the measured vehicle speed; and filtering said computed product to form said lateral acceleration related parameter.

6. A yaw rate control method utilizing differential barking of the vehicle wheels to impart a desired yaw moment on the vehicle, the method comprising the steps of:

measuring the vehicle speed and steering angle;

determining a desired yaw rate for the vehicle;

determining an actual yaw rate of the vehicle;

determining a yaw rate error based a deviation of said actual yaw rate from said desired yaw rate;

computing the desired yaw rate moment based on the determined yaw rate error;

monitoring a plurality of vehicle parameters, and comparing said parameters to predetermined threshold values to determine if the vehicle is operating on a banked surface;

forming a yaw rate offset based on the determined yaw rate when it is determined that the vehicle is operating on a banked surface; and compensating the determined yaw rate error with said yaw rate offset to compensate the yaw rate control for yaw rate effects due to the banked surface, wherein the step of forming a yaw rate offset based on the determined yaw rate error includes the steps of:

filtering the determined yaw rate error;

comparing the filtered yaw rate error to a reference yaw rate error; and forming the yaw rate offset according to the lesser of the filtered yaw rate error and the reference yaw rate error.

7. The yaw rate control of claim 1, wherein the step of compensating the yaw rate error includes the step of:

applying said yaw rate offset to the determined desired yaw rate.

* * * * *